US006473383B1

United States Patent
Durnin et al.

(10) Patent No.: US 6,473,383 B1
(45) Date of Patent: Oct. 29, 2002

(54) SINGLE SOURCE OPTICAL DISC DATA STORAGE SYSTEM

(75) Inventors: James E. Durnin; Edward C. Gage, both of Apple Valley; Ronald E. Gerber, Richfield, all of MN (US)

(73) Assignee: Seagate Technology, Inc., Scotts Valley, CA (US)

( * ) Notice: Subject to any disclaimer, the term of this patent is extended or adjusted under 35 U.S.C. 154(b) by 0 days.

(21) Appl. No.: 09/385,192

(22) Filed: Aug. 30, 1999

Related U.S. Application Data
(60) Provisional application No. 60/123,494, filed on Mar. 9, 1999.

(51) Int. Cl.[7] .................................................. G11B 7/00
(52) U.S. Cl. .......................... 369/112.01; 369/112.27; 369/119; 369/44.17
(58) Field of Search .................... 369/44.11, 44.12, 369/44.14, 44.23, 44.28, 44.37, 112.01, 112.04, 112.27, 119, 44.17, 44.18, 44.19, 44.21

(56) References Cited

U.S. PATENT DOCUMENTS

| | | | |
|---|---|---|---|
| 4,408,311 A | 10/1983 | Suzuki et al. ............... 369/43 |
| 4,460,988 A | 7/1984 | Gordon ...................... 369/32 |
| 4,498,165 A | 2/1985 | Wilkinson, Jr. ............. 369/270 |
| 4,507,773 A | 3/1985 | McCann et al. ............. 369/110 |
| 4,566,087 A | 1/1986 | Kraft ......................... 369/34 |
| 4,577,307 A | 3/1986 | Woods et al. ............... 369/270 |
| 4,581,529 A | 4/1986 | Gordon ...................... 250/227 |
| 4,775,907 A | 10/1988 | Shtipelman ................. 360/106 |
| 4,794,586 A | 12/1988 | Korth et al. ................ 369/215 |
| 4,831,470 A | 5/1989 | Brunnett et al. ............. 369/75 |
| 4,860,137 A | 8/1989 | Shtipelman ................. 360/106 |
| 4,893,206 A | 1/1990 | Shtipelman et al. ........ 360/106 |
| 5,023,861 A | 6/1991 | Champagne et al. ....... 369/215 |
| 5,245,491 A | 9/1993 | Horie et al. ................. 360/114 |
| 5,303,224 A | 4/1994 | Chikuma et al. ........... 369/275 |
| 5,313,332 A | 5/1994 | Schell et al. ................ 359/813 |
| 5,473,585 A | 12/1995 | Kim ........................... 369/36 |
| 5,610,902 A | 3/1997 | Childers et al. ............ 369/289 |
| 5,677,904 A | 10/1997 | Yokota et al. .............. 369/244 |
| 5,825,743 A | 10/1998 | Alon et al. ................. 369/121 |
| 5,828,054 A | 10/1998 | Schell ....................... 250/201.5 |
| 5,828,482 A | 10/1998 | Jain .......................... 359/211 |
| 5,881,042 A | 3/1999 | Knight ...................... 369/969 |
| 6,044,056 A | * 3/2000 | Wilde et al. ................ 369/119 |
| 6,275,455 B1 | * 8/2001 | Belser ..................... 369/44.26 |

* cited by examiner

*Primary Examiner*—Muhammad Edun
(74) *Attorney, Agent, or Firm*—Westman, Champlin & Kelly

(57) ABSTRACT

An optical data storage system that includes an optical source and an optical storage medium. The system includes a plurality of armatures positioned adjacent to the optical storage medium. Mounted on each armature are elements that perform functions such as beam-splitting, beam-shaping, relaying and fine tuning to collectively form an armature-mounted optical coupling system. An optical switch couples the optical source to each of the armature-mounted optical coupling systems. This configuration of an optical data storage system ensures that one optical source can be utilized for a plurality of optical detection systems.

19 Claims, 3 Drawing Sheets

SINGLE SOURCE OPTICAL DISC DATA STORAGE SYSTEM

This application claims priority benefits from U.S. provisional patent application No. 60/123,494, filed Mar. 9, 1999, entitled "SPLIT FIXED OPTICS MODULE FOR OPTICAL DATA STORAGE".

BACKGROUND OF THE INVENTION

The present invention relates to optical systems. In particular, the present invention relates to optical systems using a single optical source in data storage devices.

Optical data storage systems access data by focusing a laser beam or other light source onto a data surface of a medium and analyzing the light reflected from or transmitted through the medium. In general, data is stored in optical storage systems in the form of marks carried on the surface of the medium which are detected using a reflected laser light.

Compact discs, which are widely used to store computer programs, music and video, are one type of optical data storage system. Typically, compact discs are permanently recorded during manufacture by etching the surface of the compact disc. Another type of optical system is a write once read many (WORM) system in which a user may permanently write information onto a blank disc. Other types of systems are erasable, such as phase change and magneto-optic (M-O) systems. Phase change systems detect data by sensing a change in reflectivity. M-O systems read data by measuring the rotation of the incident light polarization due to the magnetic state of the storage medium.

In many prior art optical disc storage systems, the optical head is carried on a mechanical actuator which moves the head across the disc surface. In some more recent data storage systems, the optical head is carried on a slider which flies over the surface of the disc and is located at the end of an actuator arm. A significant portion of the optics in such systems is not carried on the armature. Instead, much of the optics is spaced apart from the armature and light from the optics is directed to a slider, for example by directing a beam toward the slider or by using an optical fiber.

SUMMARY OF THE INVENTION

An optical data storage system that includes an optical source and an optical storage medium. The system includes a plurality of armatures positioned adjacent to the optical storage medium. Mounted on each armature are elements that perform functions such as beam-splitting, beam-shaping, relaying and fine tuning to collectively form an armature-mounted optical coupling system. An optical switch couples the optical source to each of the armature-mounted optical coupling systems. This configuration of an optical data storage system ensures that one optical source can be utilized for a plurality of optical detection systems.

DETAILED DESCRIPTION OF EXAMPLE EMBODIMENTS

One technique disclosed in U.S. patent application Ser. No. 09/385,789, entitled "OPTICAL DISC DATA STORAGE SYSTEM" that claims priority from U.S. provisional patent application Ser. No. 60/123,493, entitled "FIXED OPTICS MODULE FOR OPTICAL DATA STORAGE" filed on Mar. 9, 1999, addresses some of the problems discussed in the background section. This application has an optical source such as a laser diode that generates an optical beam, beam-splitting, beam-shaping and relay-optics and error signal tracking elements such as a rotatable mirror for positioning of the beam on the track on the disc, all mounted on the armature.

In spite of the advantages gained by mounting the optical source beam-splitting, beam-shaping and relay-optics, etc., on the armature, certain embodiments of an optical disc data storage system may function more efficiently by selective incorporation of elements of the optical system on to the armature.

Figure 1:
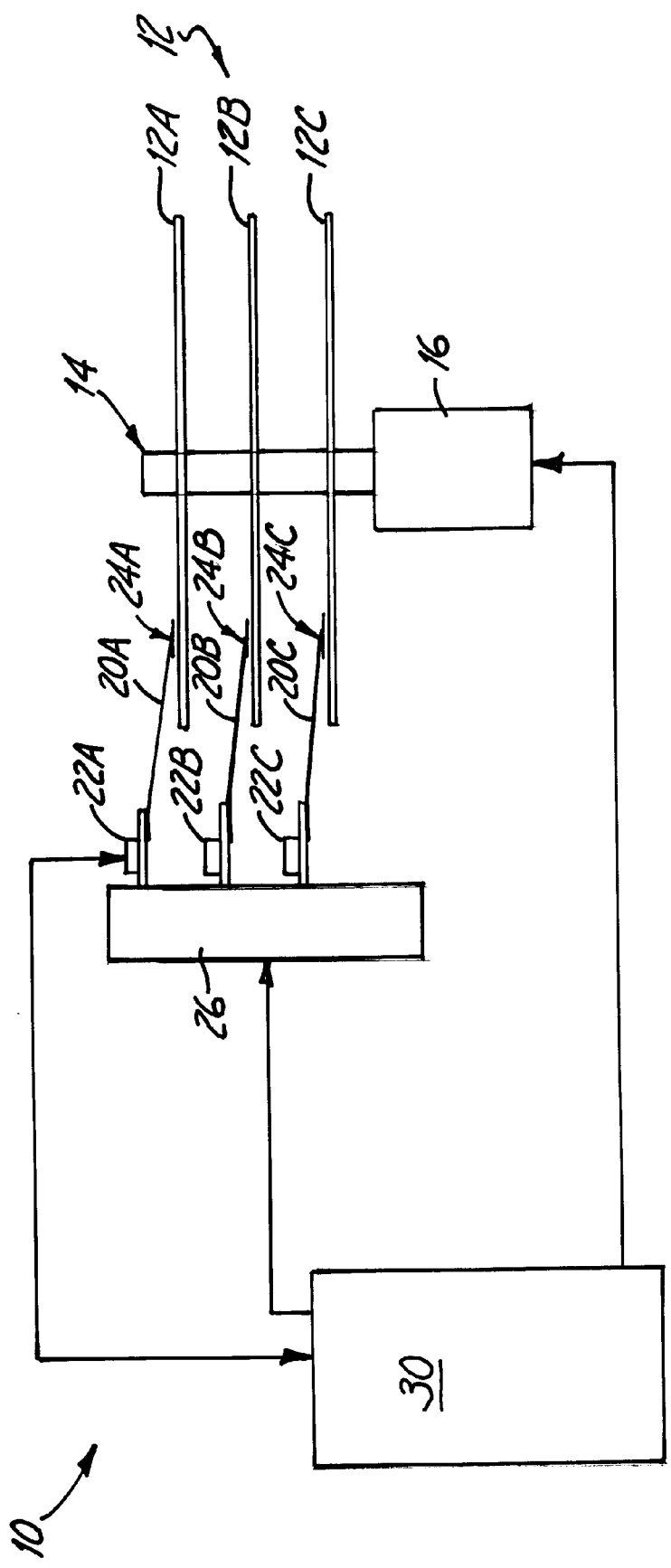
FIG. 1 is a simplified diagram of a disc drive storage system in accordance with the present invention.

FIG. 1 is a simplified block diagram of an optical disc drive storage system 10 in accordance with the present invention. Storage system 10 includes storage medium 12 such as a plurality of optical disc 12A–12C carried on spindle 14 and rotated by spindle motor 16. A plurality of actuator arms 20A–20C carry corresponding armature-mounted optical coupling systems 22A–22C thereon having optical heads 24A–24C each positioned at a distal tip for positioning over a surface of each of discs 12A–12C. Armatures 20A–20C can be, for example, rotary or linearly actuated using actuator 26 and radially positioned selectively over tracks on discs 12A–12C. A controller 30 controls positioning of the heads 24A–24C using actuator 26 and spindle motor 16. Data can be read from and written to the surface of discs 12A–12C by controller 30 using armature-mounted optical coupling system 22A as described below in more detail.

In a typical optical data storage system, a laser beam is focussed onto an optical disc. Because the area density of the disc varies inversely with the spot size squared, it is desirable to focus the beam to the smallest possible spot. In typical prior art optical disc storage systems, much of the optics was positioned off of the armature and the optical signal was coupled to the optical head either through a separate armature or through a fiber optic cable. Another, more complex system is shown in U.S. Pat. No. 4,794,586 issued Dec. 27, 1988 to Korth, entitled "ROTARY ACCESS ARM FOR OPTICAL DISCS" in which the laser and other optics is carried on the armature. However, the distal end of the armature is slid in an arcuate track which supports the armature and does not rely on a slider. The objective lens is positioned over tracks by actuating the armature using voice coils 6A and 6B. The prior art has also used a separate galvo mirror as a fine tracking actuator which is used to deflect the direction of the laser beam. The deflection of the beam is used to translate the beam across tracks on the disc for fine actuation. However, such systems have typically used optics which are separate from the armature.

An invention by the Applicant disclosed in U.S. patent application Ser. No. 09/385,789, filed on even date herewith provides an optical source such as a laser, beam-shaping and relay optics, etc., for a magneto-optical disc drive in which all the elements of the optical module are carried on the actuator armature. This is particularly advantageous because the alignment between the various elements are fixed and do not need to be adjusted due to the translation of the armature or otherwise have their alignment changed which can cause distortion or loss of focus. However, in some embodiments of optical data storage systems employing a plurality of data storage elements such as discs, having one optical source per armature-mounted optical coupling system could have disadvantages such as inadequate distribution of heat generated by the optical source and additional height of the optical storage system.

The present invention provides a single optical source such as a laser and an optical switch, both separate from the plurality of armatures that each carry an armature-mounted optical coupling system. A plurality of optical fibers extend between the optical switch and the armature-mounted optical coupling systems. Each armature-mounted optical coupling system has a separate optical fiber linked to it.

Figure 2:
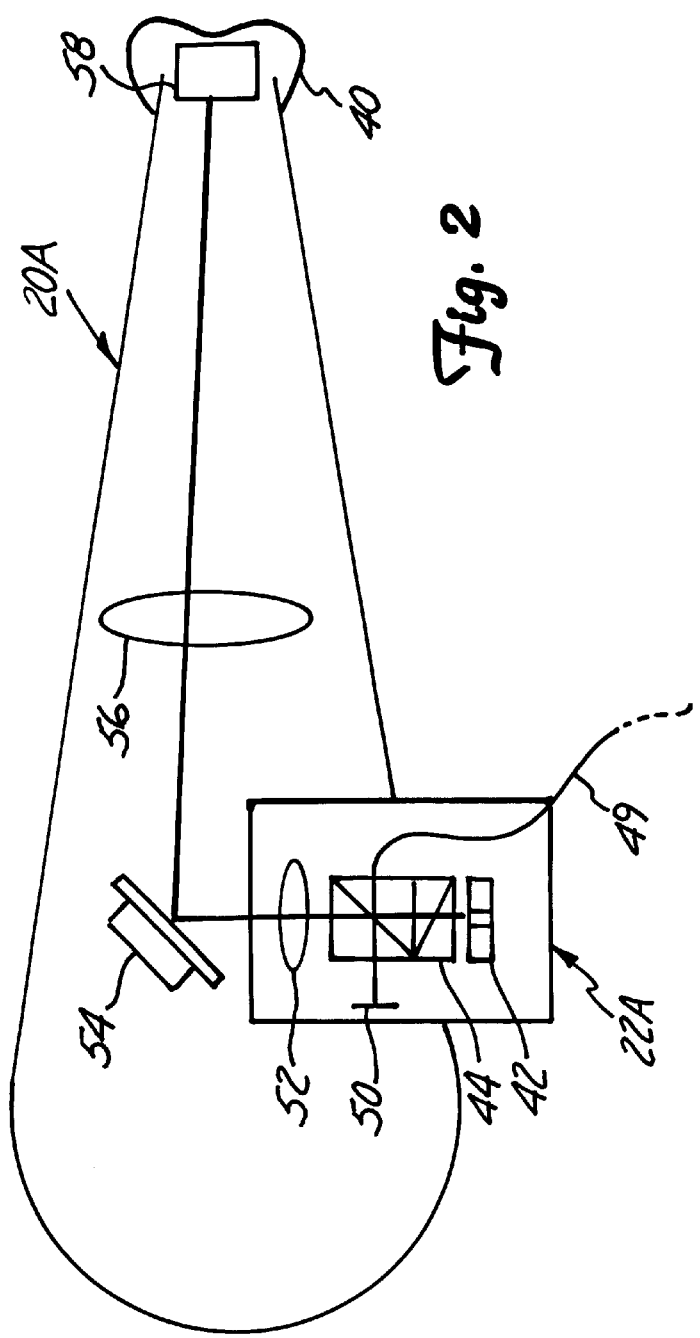
FIG. 2 is a plan view of an armature in the disc storage system of FIG. 1 which includes an armature-mounted optical coupling system in accordance with the invention.

FIG. 2 is a top plan view of armature 20A showing an armature-mounted optical coupling system 22A and optical head 24A (not shown in FIG. 2). Optical head 24A can be carried, for example, on a slider 40 adapted to fly or be dragged over the surface of disc 12A. Armature-mounted optical coupling system 22A includes quadrant detector 42, two-beam Wollaston prism 44, beam splitter 45 (not shown in FIG. 2), connection to optical fiber 49, front facet detector 50, a first relay lens 52, a rotatable mirror 54, a second relay lens 56 and a Turning mirror/detector 58. Each optical fiber of optical fibers 49 has one end connected to the optical elements on the armature and the other end connected to optical switch 48 (not shown in FIG. 2 but shown in FIG. 3). The optical switch 48 includes an input port and N output ports. An outgoing laser beam from a laser source is directed towards the input port. The outgoing laser beam is routed by the optical switch towards one of the N output ports. Alternatively, the optical switch routes a reflected laser beam from a particular one of N output ports towards the input port. Such an optical switch is described in U.S. patent application Ser. No. 09/061,597, filed on Apr. 16, 1998, and entitled "AN OPTICAL SWITCH" which is incorporated herein by reference.

Locating the optical source apart from the plurality of armature-mounted optical coupling systems, and using optical fibers with small cross-sectional areas is particularly advantageous because heat generated by the separated optical source can be effectively dissipated, and the use of narrow laser beams carried by optical fibers having small areas of cross-section results in reduced height of the individual armature-mounted optical coupling systems, thus reducing the height of the entire optical storage system. Further, the function of the laser is shared among the various discs, therefore eliminating the need for a separate laser for each disc surface.

Figure 3:
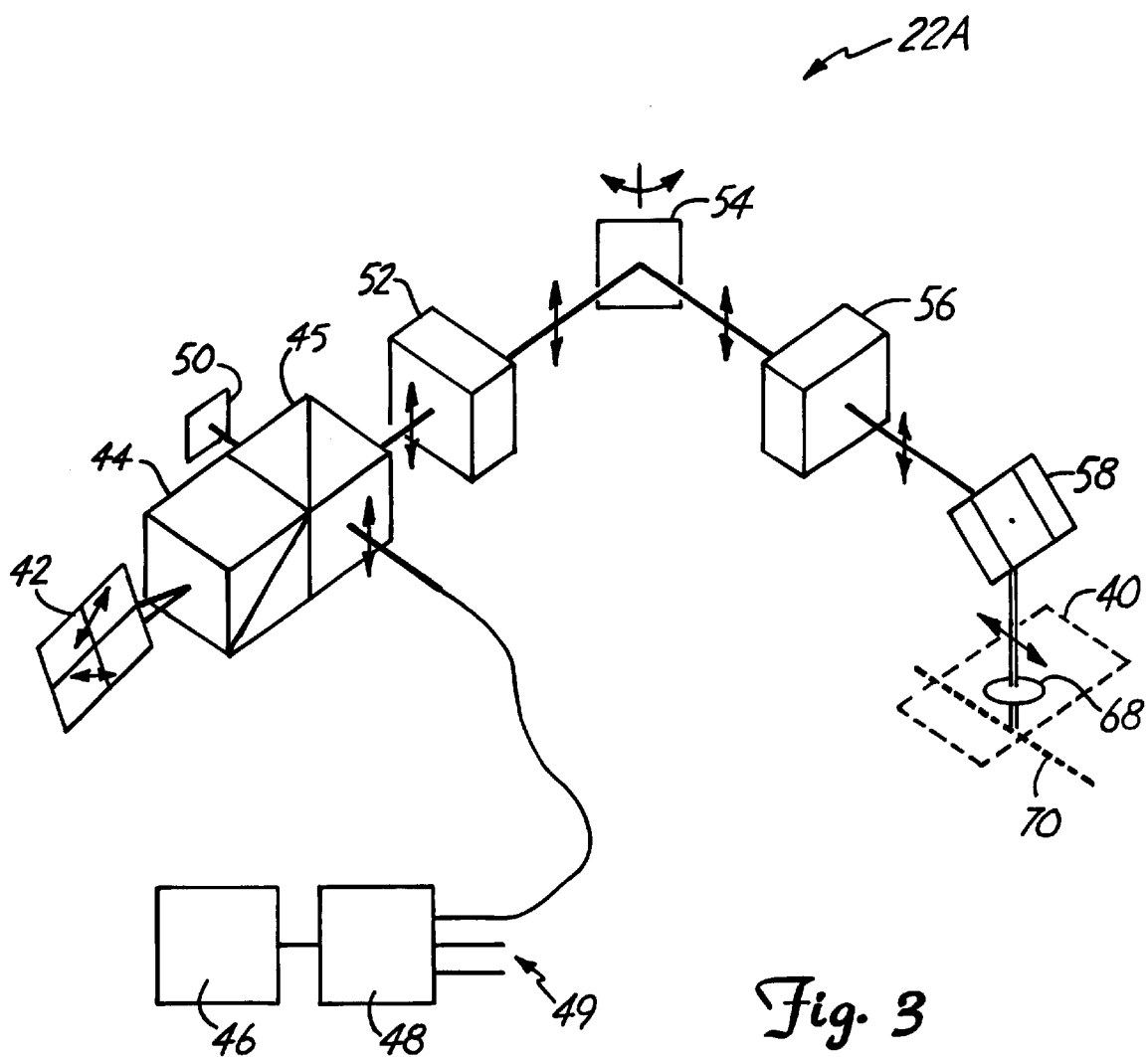
FIG. 3 is a perspective view showing the armature-mounted optical coupling system of FIG. 2 in greater detail and coupled to an optical source through an optical switch.

FIG. 3 is a more detailed perspective view of a fixed optics module 22A in connection with laser 46, switch 48 and optical fibers 49. Light from laser 46, for example a laser diode is circularized and collimated by the laser pin (not shown) and enters the optical switch 48, which transmits the beam to one of several fibers in fiber bundle 49. By selecting among he fibers in the bundle, the switch chooses which of the disc surfaces is accessed. Assuming disc 12A is being accused, the beam now enters armature-mounted optical coupling system 22A (all armature-mounted optical coupling systems are identical). The beam emerges from the end of the fiber and next passes through a beam splitter which is a "leaky" beam splitter ($R_S$=0.75, $T_S$=0.25, $R_P$=0 and $T_P$=1) that transmits roughly 25% of the optical power to a laser power monitor provided by front facet detector 50. Detector 50 is used to monitor the power output from laser 46 and provides an output to controller 30 which can adjust the beam strength or compensate for a weak beam. Approximately 75% of the optical beam from laser 46 is directed toward disc 12A. The beam passes through a first relay lens 52 that causes the light to converge. The beam next reflects off of rotatable mirror 54, comes to a focus, and is collimated by second relay lens 56. Rotatable mirror 54 provides an optical actuator and is rotated by controller 30 using an actuator (not shown) to cause fine translation between beta tracks 70 carried on the surface of disc 12A. The rotation of mirror 54 by controller 30 is in response to an error signal is described below.

The collimated beam next reflects off a Turning mirror/detector element 58 which reflects most of the light toward the objective lens (not shown) carried on slider 40 (shown in phantom in FIG. 3). A small portion of the outer part of the beam is used to generate a position signal such that controller 30 shown in FIG. 1 can monitor the position of the beam and responsively actuate rotatable mirror 54. Such a detector is described in U.S. patent application Ser. No. 09/268,012, filed Mar. 15, 1999 and entitled "ASYNCHRONOUS ANALOG DEMODULATOR AND METHOD FOR A NULL-TYPE SERVO PATTERN" which is incorporated herein by reference.

Next, the optical beam enters the optical head, which may contain objective lens 24 (not shown), Solid Immersion Lens (SIL), or additional optical elements. As used herein, optical head can include any or all such elements. After interacting with the disc surface, the reflected light returns through optical head 24A and retraces the path toward laser source 46. The beam splitter 45 transmits 100% of the p-polarized light (which contains the data signal) and 25% of the s-polarized light. Finally, the beam is split into two beams by two-beam Wollaston prism 44 and is collected by a quadrant detector 52. The polarization of the two beams exiting the Wollaston prism 44 are at +45° and −45° with respect to the split direction. The quadrant detector generates a magneto-optical data signal, a push-pull tracking error signal and a focus error signal. Operation of the quadrant detector is described in more detail in U.S. patent application Ser. No. 09/158,040, filed Sept. 21, 1998, entitled "APPARATUS AND METHOD FOR DIFFERENTIAL WAX-WANE FOCUSING AND PUSH-PULL TRACKING FOR MAGNETO-OPTICAL DATA STORAGE".

During operation, controller 30 moves slider 40 over the surface of disc 12A by actuating actuator 26. Fine positioning of the optical beam is through the use of an optical actuator such as rotatable mirror 54. As used herein, an optical actuator is any device which can change the direction of an optical beam.

The present invention has the optical source spaced apart from the armature-mounted optical coupling system which is mounted on the armature, thereby providing for dual advantages of having a single optical source for multiple discs and also accomplishing the tracking functions by moving parts that are not flying on the optical head. Additionally, because the fiber and switch are not in the path between the armature-mounted optical coupling system and the media, a high signal to noise ratio is preserved, i.e., the fiber loss and phase shifts do not disturb the signal. The laser noise is greatly reduced and the signal amplitude is greatly increased over the prior art head designs. Both of these effects are achieved by not coupling the return beam back into a single made fiber, which is a lossy process and causes more partition noise.

Figure 4:
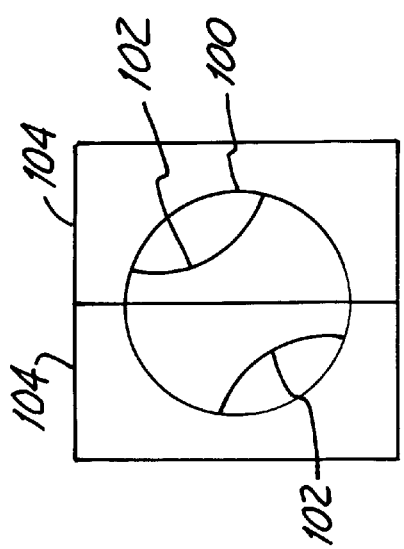
FIG. 4 is a diagram used to illustrate the effects of head skew.

FIG. 4 illustrates an additional advantage of the present invention over the prior art with the invention, the effects of head skew can be reduced.

One quantity that affects performance is head skew, where the head skew is defined as the angle between a data track at the head and the split between the two detector elements that are used to generate the push-pull tracking error signal. In the presence of large amounts of head skew, the push-pull tracking error signal is degraded. An example of head skew is shown in FIG. 4. The circle 100 is the outline of the return beam, and the arcs 102 on the left and right sides of circle 100 subtend the region where the tracking error signal is generated. Rectangles 104 are the left and right halves of a split detector, which collects the light in the left and right halves of the beam, respectively. In the absence of head skew, the left and rights sides of the beam pattern are split symmetrically by the edge between the detector elements.

In one embodiment, the optical path along the armature is centered on the line between the actuator pivot point and the head. This design showed very little head skew (−3°) at the inner diameter of the disk, but significant head skew (+17°) at the outer diameter. The tracking performance at the outer diameter was unacceptably poor.

In a preferred embodiment, the optical path was moved away from the line that connects the pivot point and the head, and balanced the head skew between −10° at the inner diameter and +10° at the outer diameter. These head skew values showed acceptable tracking performance at both inner and outer diameters of the disk.

Although the present invention has been described with reference to preferred embodiments, workers skilled in the art will recognize that changes may be made in form and detail without departing from the spirit and scope of the invention. Although the terms "optical" and "light" are used, the invention can be used with any wavelength electromagnetic radiation.

What is claimed is:

1. An optical data storage system, comprising:
   an optical source;
   an optical storage medium;
   a plurality of armatures, each armature having a distal end positioned adjacent to said optical storage medium and said armature having a proximal end located opposite said distal end;
   a plurality of armature-mounted optical coupling systems, at least one such optical coupling system on each armature;
   an optical switch coupling the optical source to said plurality of armature-mounted optical coupling systems, such that one optical source can be utilized for said plurality of optical coupling systems; and
   a plurality of optical fibers configured to couple the output of said optical switch to the proximal ends of the plurality of armature-mounted optical coupling systems.

2. The optical storage system of claim 1 wherein said optical storage medium has a plurality of optical surfaces.

3. The optical storage system of claim 2 wherein each of said plurality of optical surfaces is a surface of an optical disc.

4. The optical storage system of claim 1 wherein the plurality of armatures move about a pivot point and an optical path along each armature is offset from a line extending between the pivot point and an optical head.

5. The optical data storage system of claim 1 further comprising a plurality of optical fibers, each extending between said optical switch and said plurality of armature-mounted optical coupling systems.

6. The optical data storage system of claim 5, wherein each of said plurality of optical fibers has a substantially small cross-sectional area with a corresponding reduced height of each armature-mounted optical coupling system of each of said plurality of armatures, thereby reducing the height of the optical storage system.

7. The optical data storage system of claim 1, wherein the optical data source is spaced apart from armature-mounted optical coupling system to dissipate heat generated by the optical source.

8. The optical storage system of claim 1 wherein each of said plurality of armature-mounted optical coupling systems comprise an optical transducer that provides an optical beam directed parallel to an optical surface of said plurality of optical surfaces.

9. The optical storage system of claim 1 wherein each of said plurality of armature-mounted optical coupling systems further comprise an optical actuator mounted on the armature and positioned in the optical beam to adjust a direction of the optical beam.

10. The optical storage system of claim 1 wherein each of said plurality of armature-mounted optical coupling systems further comprise a mirror positioned to direct the optical beam in a direction perpendicular to the optical surface.

11. The optical storage system of claim 1 wherein each of said plurality of armature-mounted optical coupling systems further comprise an optical head at a distal end of the armature with said optical head adapted to couple the optical beam to the optical surface.

12. The optical storage system of claim 1 wherein each of said plurality of armature-mounted optical coupling systems further comprise an arm actuator coupled to the armature and adapted to move the armature relative to the optical surface and provide coarse positioning of the optical head.

13. A method of reading data from a plurality of optical surfaces in an optical storage system, comprising the steps of:
   directing light from an optical source toward an optical switch;
   actuating the optical switch to selectively couple the light from the optical source to one of a plurality of optical fibers which couple to a proximal end of an armature; and
   actuating an armature-mounted optical coupling system, the armature having a distal end positioned adjacent one or more of said plurality of optical surfaces and said armature having the proximal end located opposite said distal end, connected, at its proximal end, to the selected optical fiber to optically couple to an optical surface.

14. The method of claim 13 wherein the optical source comprises a laser.

15. The method of claim 14 wherein the optical source further comprises a laser pen and the step of directing light comprises circularizing and collimating light by the laser pen.

16. The method of claim 13 comprising directing the output from an optical fiber through a beam splitter and measuring signal strength of an output from the beam splitter to thereby measure signal strength of the optical beam from the laser.

17. The method of claim 16 comprising passing a reflected signal through a two-beam Wollaston prism and directing an output from the two-beam Wollaston prism at a quadrant detector to detect data carried on the disc.

18. The method of claim wherein 13 the optical head includes an objective lens.

19. An optical storage system implementing the method of claim.

* * * * *

UNITED STATES PATENT AND TRADEMARK OFFICE
CERTIFICATE OF CORRECTION

PATENT NO. : 6,473,383 B1
DATED : October 29, 2002
INVENTOR(S) : James E. Durnin et al.

It is certified that error appears in the above-identified patent and that said Letters Patent is hereby corrected as shown below:

Title page,
Item [73], Assignee, change "Seagate Technology, Inc." to -- Seagate Technology LLC --.

Column 6,
Line 65, after "claim" insert -- 13 --.

Signed and Sealed this

Fifteenth Day of June, 2004

JON W. DUDAS
*Acting Director of the United States Patent and Trademark Office*